US012675879B2

(12) United States Patent
Oosake

(10) Patent No.: US 12,675,879 B2
(45) Date of Patent: Jul. 7, 2026

(54) MEDICAL IMAGE PROCESSING APPARATUS, MEDICAL IMAGE PROCESSING METHOD, AND PROGRAM

(71) Applicant: FUJIFILM Corporation, Tokyo (JP)

(72) Inventor: Masaaki Oosake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 317 days.

(21) Appl. No.: 18/470,400

(22) Filed: Sep. 19, 2023

(65) Prior Publication Data

US 2024/0005500 A1 Jan. 4, 2024

Related U.S. Application Data

(63) Continuation of application No. PCT/JP2022/011198, filed on Mar. 14, 2022.

(30) Foreign Application Priority Data

Mar. 23, 2021 (JP) ................................ 2021-048511

(51) Int. Cl.
*G06V 10/764* (2022.01)
*G06F 3/16* (2006.01)
(Continued)

(52) U.S. Cl.
CPC .............. *G06T 7/0012* (2013.01); *G06F 3/16* (2013.01); *G06T 7/62* (2017.01); *G06V 10/25* (2022.01); *G06V 10/764* (2022.01)

(58) Field of Classification Search
None
See application file for complete search history.

(56) References Cited

U.S. PATENT DOCUMENTS 4,025,919 A * 5/1977 Jefferies .............. G01S 15/8902
367/106
11,690,494 B2 7/2023 Mori et al.
(Continued)

FOREIGN PATENT DOCUMENTS

CN 111970955 11/2020
EP 4302680 1/2024
(Continued)

OTHER PUBLICATIONS

"Search Report of Europe Counterpart Application", issued on Jul. 30, 2024, pp. 1-9.
(Continued)

*Primary Examiner* — Tsung Yin Tsai
(74) *Attorney, Agent, or Firm* — JCIPRNET

(57) ABSTRACT

A medical image processing apparatus (14) is a medical image processing apparatus including a processor and an audio notifier (17) configured to output a notification sound. The processor is configured to perform: image reception processing for receiving time-series continuous images; region-of-interest detection processing for detecting a region of interest from the images; and audio control processing for performing control to cause the audio notifier to output the notification sound for a certain period if the region of interest is currently detected in the region-of-interest detection processing, the audio control processing causing the audio notifier to output the notification sound in accordance with a first time, the first time being a time from a time point at which detection of the region of interest has previously ended in the region-of-interest detection processing until a time point at which the region of interest is currently detected in the region-of-interest detection processing.

14 Claims, 15 Drawing Sheets

(51) Int. Cl.
 *G06T 7/00*     (2017.01)
 *G06T 7/62*     (2017.01)
 *G06V 10/25*    (2022.01)

(56)      References Cited

U.S. PATENT DOCUMENTS

| | | | | |
|---|---|---|---|---|
| 11,862,327 | B2 | 1/2024 | Endo | |
| 11,910,994 | B2 | 2/2024 | Takenouchi | |
| 12,053,145 | B2 | 8/2024 | Endo | |
| 12,169,934 | B2 * | 12/2024 | Nguyen | A61B 6/469 |
| 12,185,905 | B2 | 1/2025 | Takenouchi | |
| 2016/0174934 | A1 * | 6/2016 | Cong | A61B 8/4263 |
| | | | | 600/459 |
| 2019/0198160 | A1 * | 6/2019 | Barral | G06T 7/0014 |
| 2019/0200998 | A1 * | 7/2019 | Shelton, IV | A61B 5/0066 |
| 2019/0339159 | A1 * | 11/2019 | Israelsen | G06T 7/001 |
| 2020/0008650 | A1 * | 1/2020 | Michihata | G06T 7/254 |
| 2020/0187827 | A1 * | 6/2020 | Addison | A61B 5/0816 |
| 2021/0153720 | A1 | 5/2021 | Usuda | |
| 2021/0153975 | A1 * | 5/2021 | Polonsky | A61B 90/98 |
| 2021/0274999 | A1 | 9/2021 | Kubota et al. | |
| 2022/0151462 | A1 | 5/2022 | Usuda | |
| 2023/0129584 | A1 * | 4/2023 | Nguyen | A61B 6/4057 |
| | | | | 382/128 |
| 2023/0162357 | A1 * | 5/2023 | Goto | G06V 10/25 |
| | | | | 382/118 |

FOREIGN PATENT DOCUMENTS

| | | |
|---|---|---|
| JP | 2005080843 | 3/2005 |
| JP | 2006129950 | 5/2006 |
| JP | 2019072243 | 5/2019 |
| WO | 2020036109 | 2/2020 |
| WO | 2020040086 | 2/2020 |
| WO | 2020054543 | 3/2020 |
| WO | 2020067105 | 4/2020 |
| WO | 2020110214 | 6/2020 |
| WO | 2020170791 | 8/2020 |
| WO | 2021029292 | 2/2021 |

OTHER PUBLICATIONS

Alex Krizhevsky et al., "ImageNet Classification with Deep Convolutional Neural Networks", NIPS'12: Proceedings of the 25th International Conference on Neural Information Processing Systems, Dec. 3, 2012, pp. 1-9.
"International Search Report (Form PCT/ISA/210) of PCT/JP2022/011198", mailed on May 24, 2022, with English translation thereof, pp. 1-5.
"Written Opinion of the International Searching Authority (Form PCT/ISA/237) of PCT/JP2022/011198", mailed on May 24, 2022, with English translation thereof, pp. 1-10.
"Notice of Reasons for Refusal of Japan Counterpart Application", issued on Sep. 17, 2025, with English translation thereof, p. 1-p. 15.
"Notice of reasons for refusal of Japan Counterpart Application", issued on Feb. 25, 2026, with English translation thereof, pp. 1-13.
"Office Action of China Counterpart Application", issued on Feb. 27, 2026, with English translation thereof, pp. 1-19.

* cited by examiner

Figure 12:
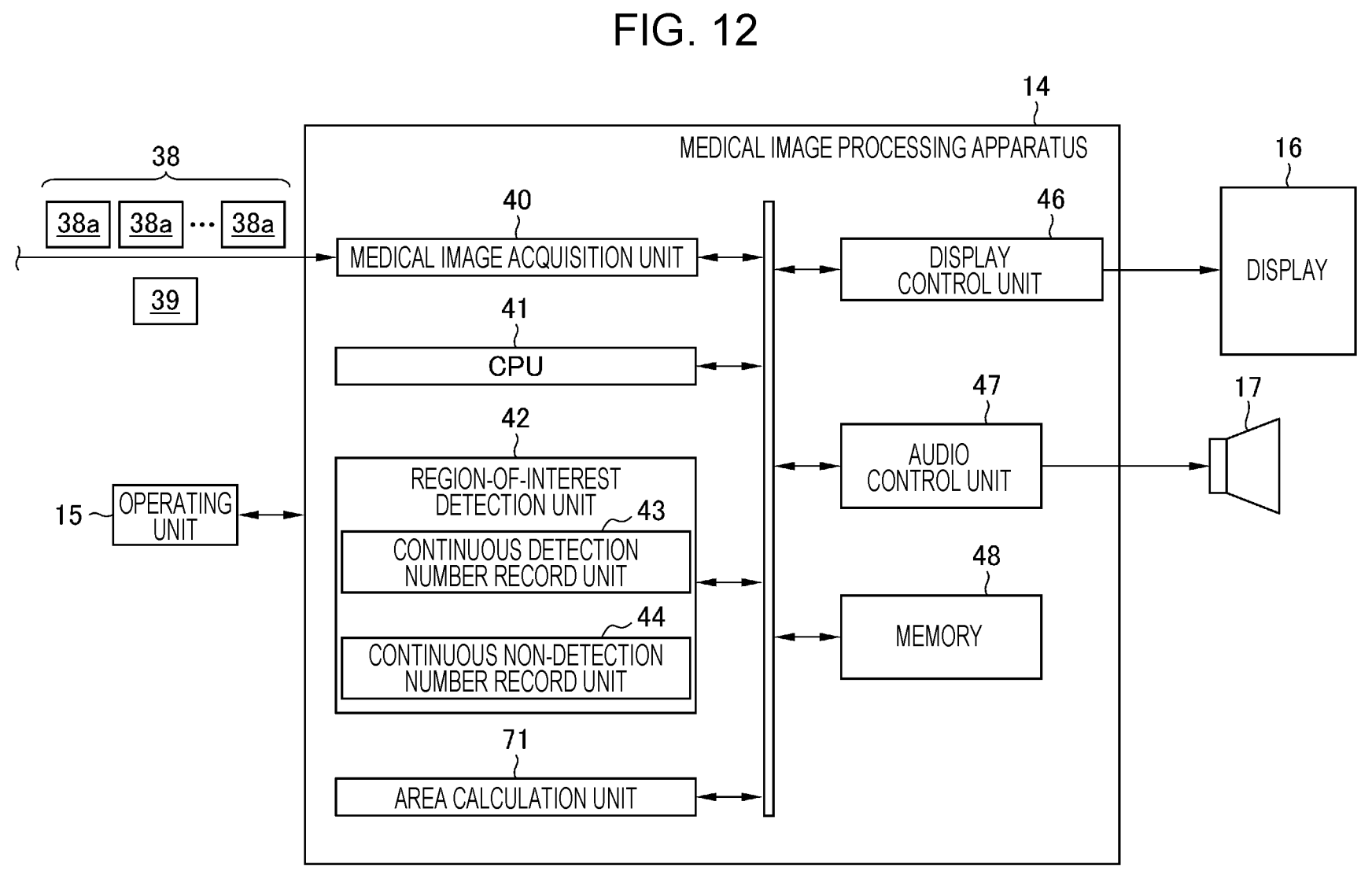

MEDICAL IMAGE PROCESSING APPARATUS 14

16   DISPLAY

17

46   DISPLAY CONTROL UNIT

47   AUDIO CONTROL UNIT

48   MEMORY

40   MEDICAL IMAGE ACQUISITION UNIT

41   CPU

42   REGION-OF-INTEREST DETECTION UNIT

43   CONTINUOUS DETECTION NUMBER RECORD UNIT

44   CONTINUOUS NON-DETECTION NUMBER RECORD UNIT

71   AREA CALCULATION UNIT 38a   38a   …   38a

38

39

15   OPERATING UNIT

FIG. 14

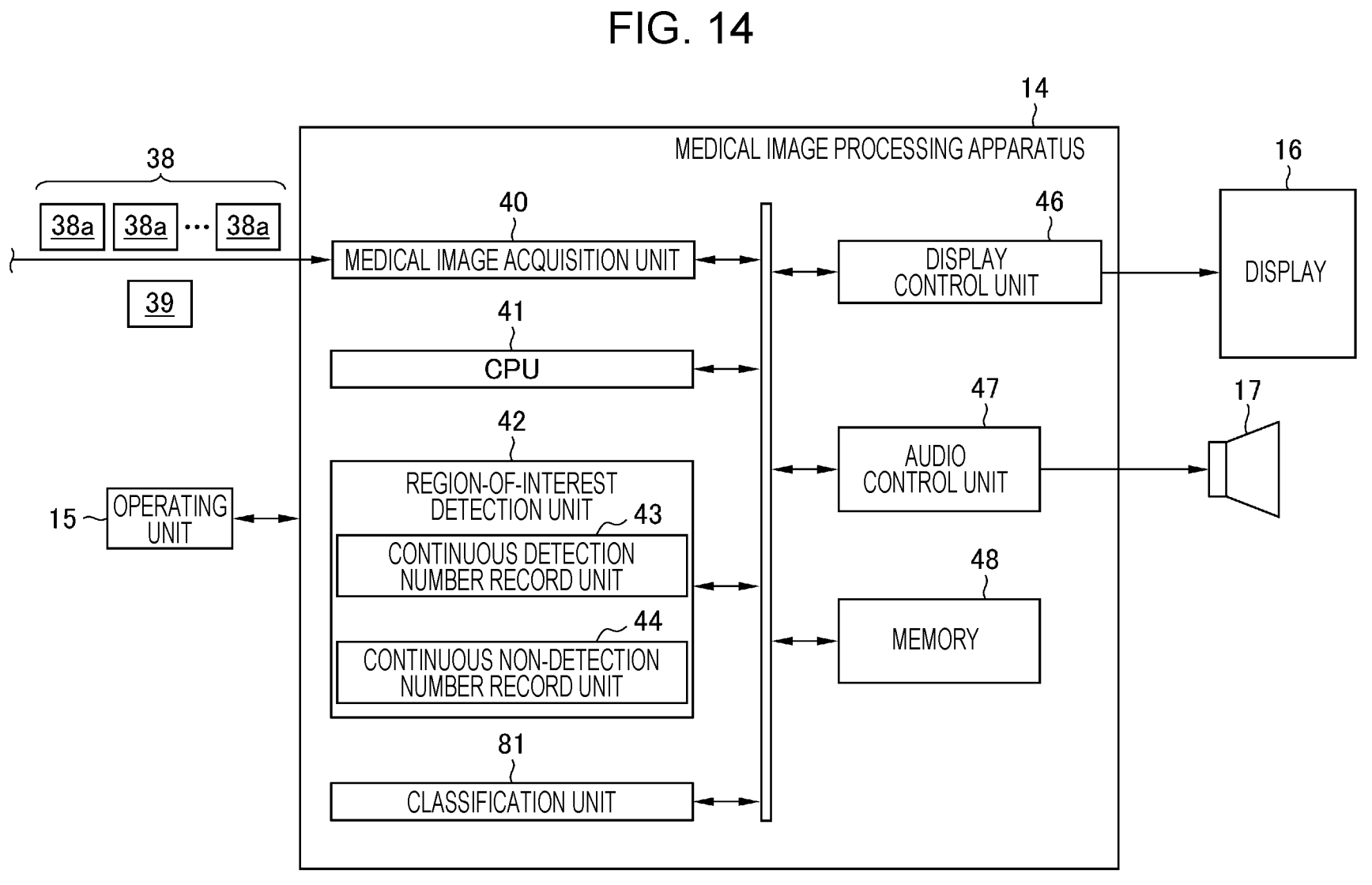

16 — DISPLAY

17

14 — MEDICAL IMAGE PROCESSING APPARATUS

46 — DISPLAY CONTROL UNIT

47 — AUDIO CONTROL UNIT

48 — MEMORY

40 — MEDICAL IMAGE ACQUISITION UNIT

41 — CPU

42 — REGION-OF-INTEREST DETECTION UNIT

43 — CONTINUOUS DETECTION NUMBER RECORD UNIT

44 — CONTINUOUS NON-DETECTION NUMBER RECORD UNIT

81 — CLASSIFICATION UNIT

38 — 38a  38a ··· 38a

39

15 — OPERATING UNIT

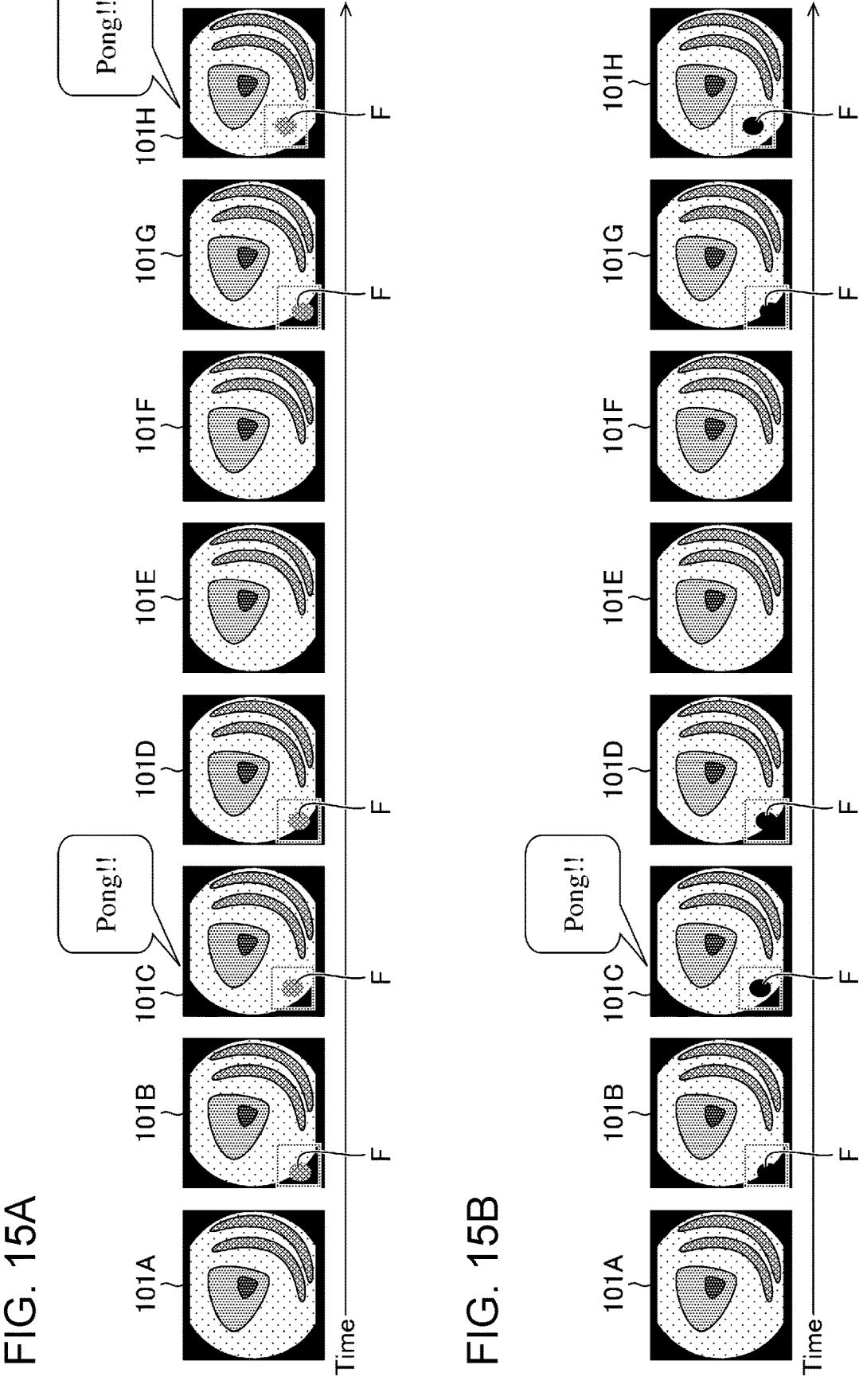

MEDICAL IMAGE PROCESSING APPARATUS, MEDICAL IMAGE PROCESSING METHOD, AND PROGRAM

CROSS-REFERENCE TO RELATED APPLICATIONS

The present application is a Continuation of PCT International Application No. PCT/JP2022/011198 filed on Mar. 14, 2022 claiming priority under 35 U.S.C § 119(a) to Japanese Patent Application No. 2021-048511 filed on Mar. 23, 2021. Each of the above applications is hereby expressly incorporated by reference, in its entirety, into the present application.

BACKGROUND OF THE INVENTION

1. Field of the Invention

The present invention relates to a medical image processing apparatus, a medical image processing method, and a program, and in particular, to techniques of a medical image processing apparatus, a medical image processing method, and a program for outputting a notification sound.

2. Description of the Related Art

In an endoscopic examination, a user (e.g., a doctor) inserts a scope with a camera attached to a distal end thereof into a body cavity of a subject for examination. An endoscopic image captured by the camera provided in the scope is displayed on a display screen, and the user observes the endoscopic image. In general, in an endoscopic examination, the user observes the endoscopic image and finds a lesion or performs treatment such as cutting off the lesion.

In the endoscopic examination, since image capturing and examination are performed at the same time by operating the scope, a burden on the user is large, and a lesion may be missed, which is problematic.

In recent years, highly accurate automatic image recognition has been made possible by deep learning (A. Krizhevsky, I. Sutskever, and G. Hinton. ImageNet classification with deep convolutional neural networks. In NIPS, 2012). Also in the endoscopic examination, a system has been proposed in which a lesion is automatically detected from the endoscopic image, and the user is notified of it. For example, there is known a technique in which, if a region of interest in the endoscopic image is detected by a detector (trained model) that has been trained in deep learning, the user is notified of the detected region of interest by a display (monitor) displaying a notification mark or displaying the region of interest in an emphasized manner by surrounding the region of interest with a square. However, since the user visually performs the endoscopic examination, the user may miss even the above-described notification display or emphasis display.

In contrast, it has been proposed that, if a region of interest is detected, a sound is emitted concurrently with the notification display to influence the user not only visually but also audibly, thereby calling attention (JP2006-129950A).

SUMMARY OF THE INVENTION

However, if the notification sound is continuously output while the region of interest is detected, the user may feel uncomfortable. Thus, when the region of interest is detected, the notification sound is output and then stopped even if the region of interest is continuously detected. Accordingly, it is possible to prevent the user from feeling uncomfortable.

Here, since the scope is moved in the endoscopic examination, the region of interest may temporarily deviate from an image capturing screen. In addition, if the region of interest (lesion) is treated while the endoscopic image is being observed, the lesion may temporarily disappear from the screen because, for example, the region of interest is shielded by a treatment tool. Furthermore, the detector may temporarily fail to detect the region of interest due to water supply performed while the endoscopic image is being observed, or a shake, blur, or the like of the endoscopic image. If the detection of the region of interest is temporarily stopped in this manner, and then, if the notification sound is output in response to the detection of the region of interest again, the output of the notification sound is repeated within a short time, and thus, the user feels uncomfortable. In addition, since the output of the notification sound is repeated many times within a short time in this manner, the user becomes accustomed to the notification sound, and the effectiveness of the notification sound in calling attention is reduced.

The above-described JP2006-129950A does not refer to the problem of such repetitive output of the notification sound in a short time.

The present invention has been made in view of such circumstances, and an object thereof is to provide a medical image processing apparatus, a medical image processing method, and a program by which a notification sound can be output without making a user feel uncomfortable and without impairing the effectiveness of the notification sound in calling attention.

A medical image processing apparatus according to an aspect of the present invention for achieving the above object is a medical image processing apparatus including a processor and an audio notifier configured to output a notification sound. The processor is configured to perform: image reception processing for receiving time-series continuous images; region-of-interest detection processing for detecting a region of interest from the images; and audio control processing for performing control to cause the audio notifier to output the notification sound for a certain period if the region of interest is currently detected in the region-of-interest detection processing, the audio control processing causing the audio notifier to output the notification sound in accordance with a first time, the first time being a time from a time point at which detection of the region of interest has previously ended in the region-of-interest detection processing until a time point at which the region of interest is currently detected in the region-of-interest detection processing.

According to this aspect, the notification sound is output from the audio notifier in accordance with the first time from the time point at which detection of the region of interest has previously ended until the time point at which the region of interest is currently detected. Thus, output of the notification sound can be controlled based on the timing of the previous detection of the region of interest, and the notification sound can be output without making the user feel uncomfortable and without impairing the effectiveness of the notification sound in calling attention.

Preferably, the audio control processing stops output of the notification sound if the region of interest is intermittently detected in the region-of-interest detection processing and the first time is less than a first threshold value.

According to this aspect, even if the region of interest is intermittently detected, output of the notification sound is not repeated, and the notification sound can be output without making the user feel uncomfortable and without impairing the effectiveness of the notification sound in calling attention.

Preferably, the audio control processing causes the audio notifier to output the notification sound if the first time is greater than or equal to the first threshold value, and stops output of the notification sound by the audio notifier if the first time is less than the first threshold value.

Preferably, the processor is configured to perform second time detection processing for detecting a second time corresponding to the first time in a case where the region of interest has been previously detected in the region-of-interest detection processing, and threshold value change processing for changing the first threshold value in accordance with the second time.

According to this aspect, the first threshold value is changed in accordance with the second time corresponding to the first time in a case where the region of interest has been previously detected, and output of the notification sound is controlled based on the first threshold value. Thus, the notification sound can be output at an appropriate timing, and the notification sound can be output without making the user feel uncomfortable and without impairing the effectiveness of the notification sound in calling attention.

Preferably, the processor is configured to perform number-of-regions-of-interest count processing for counting a number of regions of interest detected in the images in the region-of-interest detection processing, and the threshold value change processing increases the first threshold value if the number of regions of interest is greater than or equal to a second threshold value.

According to this aspect, the number of detected regions of interest is counted, and if the number is greater than or equal to the second threshold value, the first threshold value is increased. Thus, the notification sound can be output at an appropriate timing, and the notification sound can be output without making the user feel uncomfortable and without impairing the effectiveness of the notification sound in calling attention.

Preferably, the processor is configured to perform number-of-regions-of-interest count processing for counting a number of regions of interest detected in the images in the region-of-interest detection processing, and the threshold value change processing decreases the first threshold value if the number of regions of interest is less than a second threshold value.

According to this aspect, the number of detected regions of interest is counted, and if the number is less than the second threshold value, the first threshold value is decreased. Thus, the notification sound can be output at an appropriate timing, and the notification sound can be output without making the user feel uncomfortable and without impairing the effectiveness of the notification sound in calling attention.

Preferably, the first threshold value is set in a range of greater than or equal to 1.5 seconds and less than or equal to 2.5 seconds.

Preferably, the first threshold value is changed in a range of greater than or equal to 0.5 seconds and less than or equal to 3.5 seconds.

Preferably, the processor is configured to perform area calculation processing for calculating an area of the region of interest detected in the region-of-interest detection processing, and the audio control processing causes the audio notifier to output the notification sound if the area calculated in the area calculation processing is less than a third threshold value, stops output of the notification sound by the audio notifier if the area calculated in the area calculation processing is greater than or equal to the third threshold value and the first time is less than the first threshold value, and causes the audio notifier to output the notification sound if the area calculated in the area calculation processing is greater than or equal to the third threshold value and the first time is greater than or equal to the first threshold value.

According to this aspect, since output of the notification sound is controlled in accordance with the area of the detected region of interest, the notification sound can be output without making the user feel uncomfortable and without impairing the effectiveness of the notification sound in calling attention.

Preferably, the processor is configured to perform classification processing for classifying the region of interest detected in the region-of-interest detection processing, and the audio control processing causes the audio notifier to output the notification sound if a classification result of classification in the classification processing is a specific type, stops output of the notification sound by the audio notifier if the classification result of classification in the classification processing is not the specific type and the first time is less than the first threshold value, and causes the audio notifier to output the notification sound if the classification result of classification in the classification processing is not the specific type and the first time is greater than or equal to the first threshold value.

According to this aspect, since output of the notification sound is controlled in accordance with the classification of the detected region of interest, the notification sound can be output without making the user feel uncomfortable and without impairing the effectiveness of the notification sound in calling attention.

Preferably, the audio control processing detects the first time, based on a number of the time-series continuous images.

Preferably, the medical image processing apparatus includes a display unit configured to display the images received in the image reception processing, in which the region of interest detected in the region-of-interest detection processing is displayed on the display unit in an emphasized manner.

A medical image processing method according to another aspect of the present invention is an image processing method using a medical image processing apparatus including a processor and an audio notifier configured to output a notification sound. The processor is configured to perform: an image reception step of receiving time-series continuous images; a region-of-interest detection step of detecting a region of interest from the images; and an audio control step of performing control to cause the audio notifier to output the notification sound for a certain period if the region of interest is currently detected in the region-of-interest detection step, the audio control step causing the audio notifier to output the notification sound in accordance with a first time, the first time being a time from a time point at which detection of the region of interest has previously ended in the region-of-interest detection step until a time point at which the region of interest is currently detected in the region-of-interest detection step.

A program according to another aspect of the present invention is a program for causing a medical image processing apparatus to execute an image processing method, the medical image processing apparatus including a processor and an audio notifier configured to output a notification sound, the program causing the processor to perform: an image reception step of receiving time-series continuous images; a region-of-interest detection step of detecting a region of interest from the images; and an audio control step of performing control to cause the audio notifier to output the notification sound for a certain period if the region of interest is currently detected in the region-of-interest detection step, the audio control step causing the audio notifier to output the notification sound in accordance with a first time, the first time being a time from a time point at which detection of the region of interest has previously ended in the region-of-interest detection step until a time point at which the region of interest is currently detected in the region-of-interest detection step.

According to the present invention, the notification sound is output from the audio notifier in accordance with the first time from the time point at which detection of the region of interest has previously ended until the time point at which the region of interest is currently detected. Thus, output of the notification sound can be controlled based on the timing of the previous detection of the region of interest, and the notification sound can be output without making the user feel uncomfortable and without impairing the effectiveness of the notification sound in calling attention.

BRIEF DESCRIPTION OF THE DRAWINGS

FIG. 4 is a diagram for describing a case where the notification sound is output in accordance with a continuous non-detection time;

FIG. 12 is a block diagram illustrating a configuration of the medical image processing apparatus;

FIG. 14 is a block diagram illustrating a configuration of the medical image processing apparatus; and FIGS. 15A and 15B are diagrams for describing timings at which the notification sound is output.

DESCRIPTION OF THE PREFERRED EMBODIMENTS

Hereinafter, preferred embodiments of a medical image processing apparatus, a medical image processing method, and a program according to the present invention will be described with reference to the accompanying drawings.

Figure 1:
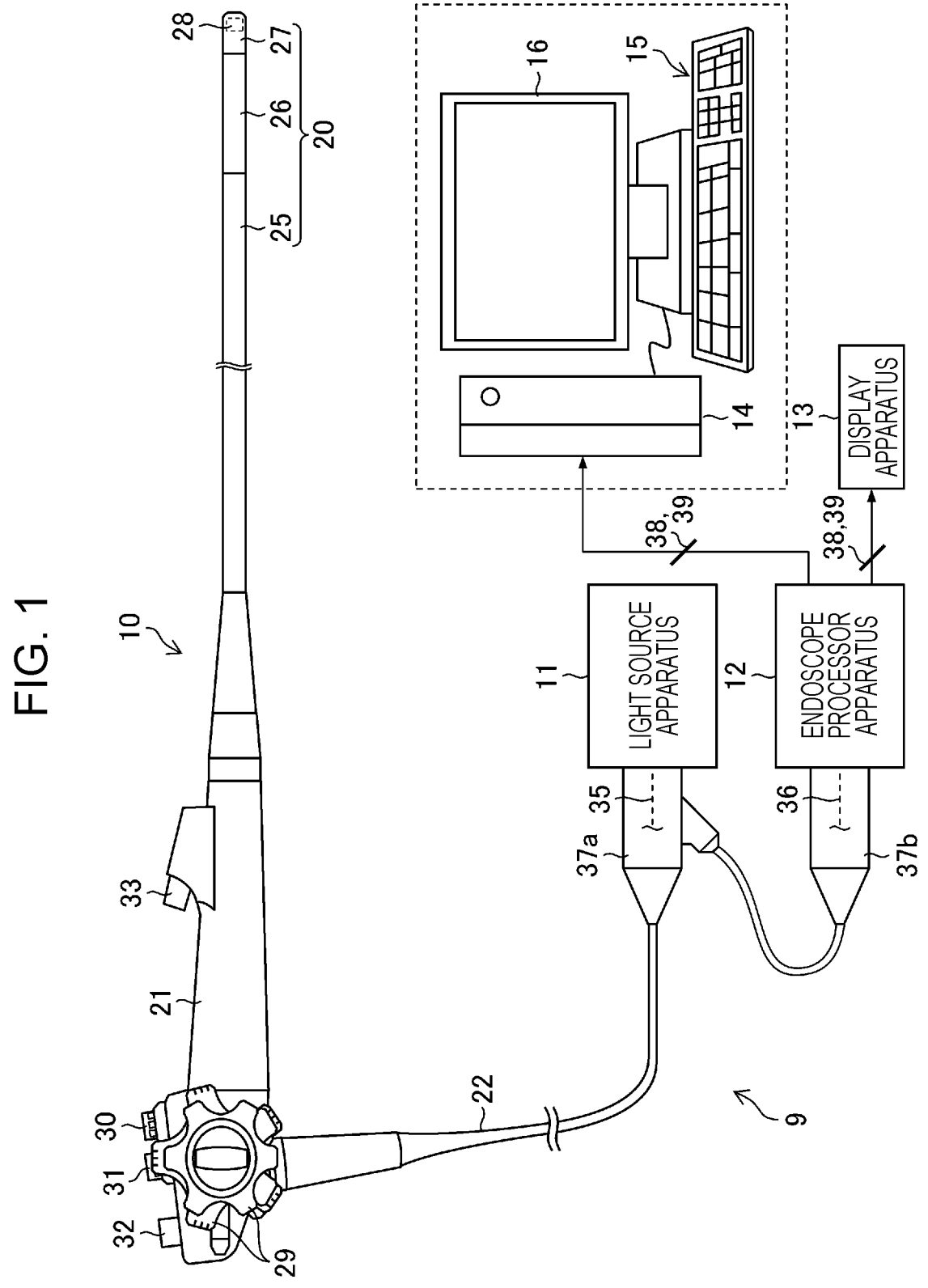
FIG. 1 is a schematic diagram illustrating an overall configuration of an endoscope system.

Overall Configuration of Endoscope System Including Medical Image Processing Apparatus FIG. 1 is a schematic diagram illustrating an overall configuration of an endoscope system including a medical image processing apparatus according to the present invention.

As illustrated in FIG. 1, an endoscope system 9 includes an endoscope 10, which is an electronic endoscope, a light source apparatus 11, an endoscope processor apparatus 12, a display apparatus 13, a medical image processing apparatus 14, an operating unit 15, and a display 16.

The endoscope 10 captures time-series medical images including a subject image and is, for example, a scope for a lower or upper digestive tract. The endoscope 10 has an insertion part 20, a handheld operating unit 21, and a universal cord 22. The insertion part 20 is to be inserted into a subject (e.g., a stomach or large intestine) and has a distal end and a proximal end. The handheld operating unit 21 is provided continuously from the proximal end side of the insertion part 20 and is held by a doctor, who is a surgeon, to perform various operations. The universal cord 22 is provided continuously from the handheld operating unit 21.

The entirety of the insertion part 20 is formed to have a small diameter and an elongated shape. The insertion part 20 is constituted by continuously providing, in order from the proximal end side to the distal end side thereof, a soft part 25, a bending part 26, and a tip part 27. The soft part 25 has flexibility. The bending part 26 can be bent by an operation of the handheld operating unit 21. In the tip part 27, an imaging optical system (objective lens), an imaging element 28, and the like, which are not illustrated, are incorporated.

The imaging element 28 is an imaging element of a complementary metal oxide semiconductor (CMOS) type or a charge coupled device (CCD) type. Image light of a site to be observed is incident on an imaging surface of the imaging element 28 through an observation window and the objective lens. The observation window, which is not illustrated, is open on a distal end surface of the tip part 27, and the objective lens, which is not illustrated, is disposed behind the observation window. The imaging element 28 captures the image light of the site to be observed, which is incident on the imaging surface (converts the image light into an electric signal) and outputs an image signal. That is, the imaging element 28 sequentially captures medical images. Note that the medical images are acquired as a moving image 38 and a still image 39, which will be described later.

The handheld operating unit 21 is provided with various operating members operated by a user (doctor). Specifically, the handheld operating unit 21 is provided with two types of bending operation knobs 29, an air/water supply button 30, and a suction button 31. The bending operation knobs 29 are used for a bending operation of the bending part 26. The air/water supply button 30 is for air supply/water supply operations. The suction button 31 is for a suction operation. The handheld operating unit 21 is further provided with a still image capturing instruction unit 32 and a treatment tool introduction port 33. The still image capturing instruction unit 32 is for issuing an instruction for capturing the still image 39 of the site to be observed. The treatment tool introduction port 33 is for inserting a treatment tool (not illustrated) into a treatment tool insertion path (not illustrated) penetrating through the insertion part 20.

The universal cord 22 is a connection cord for connecting the endoscope 10 to the light source apparatus 11. The universal cord 22 contains a light guide 35, a signal cable 36, and a fluid tube (not illustrated). The light guide 35, the signal cable 36, and the fluid tube penetrate through the insertion part 20. In addition, an end portion of the universal cord 22 is provided with a connector 37a and a connector 37b. The connector 37a is to be connected to the light source apparatus 11. The connector 37b branches off from the connector 37a and is to be connected to the endoscope processor apparatus 12.

By the connector 37a being connected to the light source apparatus 11, the light guide 35 and the fluid tube (not illustrated) are inserted into the light source apparatus 11. Thus, through the light guide 35 and the fluid tube (not illustrated), necessary illumination light, water, and gas are supplied from the light source apparatus 11 to the endoscope 10. As a result, the site to be observed is irradiated with the illumination light from an illumination window (not illustrated) on the distal end surface of the tip part 27. In accordance with a pressing operation on the above-described air/water supply button 30, the gas or water is injected from an air/water supply nozzle (not illustrated) on the distal end surface of the tip part 27 to the observation window (not illustrated) on the distal end surface.

By the connector 37b being connected to the endoscope processor apparatus 12, the signal cable 36 is electrically connected to the endoscope processor apparatus 12. Thus, through the signal cable 36, an image signal of the site to be observed is output from the imaging element 28 of the endoscope 10 to the endoscope processor apparatus 12, and also, a control signal is output from the endoscope processor apparatus 12 to the endoscope 10.

The light source apparatus 11 supplies the illumination light through the connector 37a to the light guide 35 of the endoscope 10. As the illumination light, light in various wavelength ranges in accordance with an observation purpose, such as white light (light in a white wavelength range or light in a plurality of wavelength ranges), light in one or more specific wavelength ranges, or a combination thereof is selected.

The endoscope processor apparatus 12 controls operations of the endoscope 10 through the connector 37b and the signal cable 36. In addition, based on the image signal acquired from the imaging element 28 of the endoscope 10 through the connector 37b and the signal cable 36, the endoscope processor apparatus 12 generates an image (also referred to as "moving image 38") formed of time-series frame images 38a including the subject image. Furthermore, if the still image capturing instruction unit 32 is operated in the handheld operating unit 21 of the endoscope 10, concurrently with the generation of the moving image 38, the endoscope processor apparatus 12 acquires one frame image 38a in the moving image 38 as the still image 39 in accordance with the timing of an imaging instruction.

The moving image 38 and the still image 39 are medical images obtained by capturing images of the inside of the subject, that is, a living body. In addition, if the moving image 38 and the still image 39 are images obtained with the above-described light in the specific wavelength range (special light), both are special-light images. In addition, the endoscope processor apparatus 12 outputs the generated moving image 38 and the still image 39 to each of the display apparatus 13 and the medical image processing apparatus 14. Note that the moving image 38 is acquired at 30 fps (frames per second), 60 fps, or 120 fps.

Note that the endoscope processor apparatus 12 may generate (acquire) the special-light image having information on the above-described specific wavelength range, based on a usual-light image obtained with the above-described white light. In this case, the endoscope processor apparatus 12 functions as a special-light image acquisition unit. Then, the endoscope processor apparatus 12 obtains a signal in the specific wavelength range by performing calculation based on red, green, and blue (RGB) color information or cyan, magenta, and yellow (CMY) color information included in the usual-light image.

Based on, for example, at least one of the usual-light image obtained with the above-described white light or the special-light image obtained with the above-described light in the specific wavelength range (special light), the endoscope processor apparatus 12 may generate a feature quantity image such as a known oxygen saturation image. In this case, the endoscope processor apparatus 12 functions as a feature quantity image generating unit. Note that each of the moving image 38 and the still image 39 including the above-described in-living-body image, the usual-light image, the special-light image, and the feature quantity image is a medical image obtained by converting results of imaging or measuring of a human body into an image for the purpose of image diagnosis or examination.

The display apparatus 13 is connected to the endoscope processor apparatus 12 and functions as a display unit that displays the moving image 38 and the still image 39 input from the endoscope processor apparatus 12. The user operates the insertion part 20 back and forth, for example, while viewing the moving image 38 displayed on the display apparatus 13, and, if a lesion or the like is found at the site to be observed, the doctor (user) operates the still image capturing instruction unit 32 to capture a still image of the site to be observed and give treatment such as diagnosis or biopsy. Note that the moving image 38 and the still image 39 are similarly displayed on the display 16 connected to the medical image processing apparatus 14, which will be described later. In addition, if the moving image 38 and the still image 39 are displayed on the display 16, a notification sound, which will be described later, is also output together. Accordingly, the user preferably performs diagnosis or the like by viewing what is displayed on the display 16.

First Embodiment

Medical Image Processing Apparatus

Figure 2:
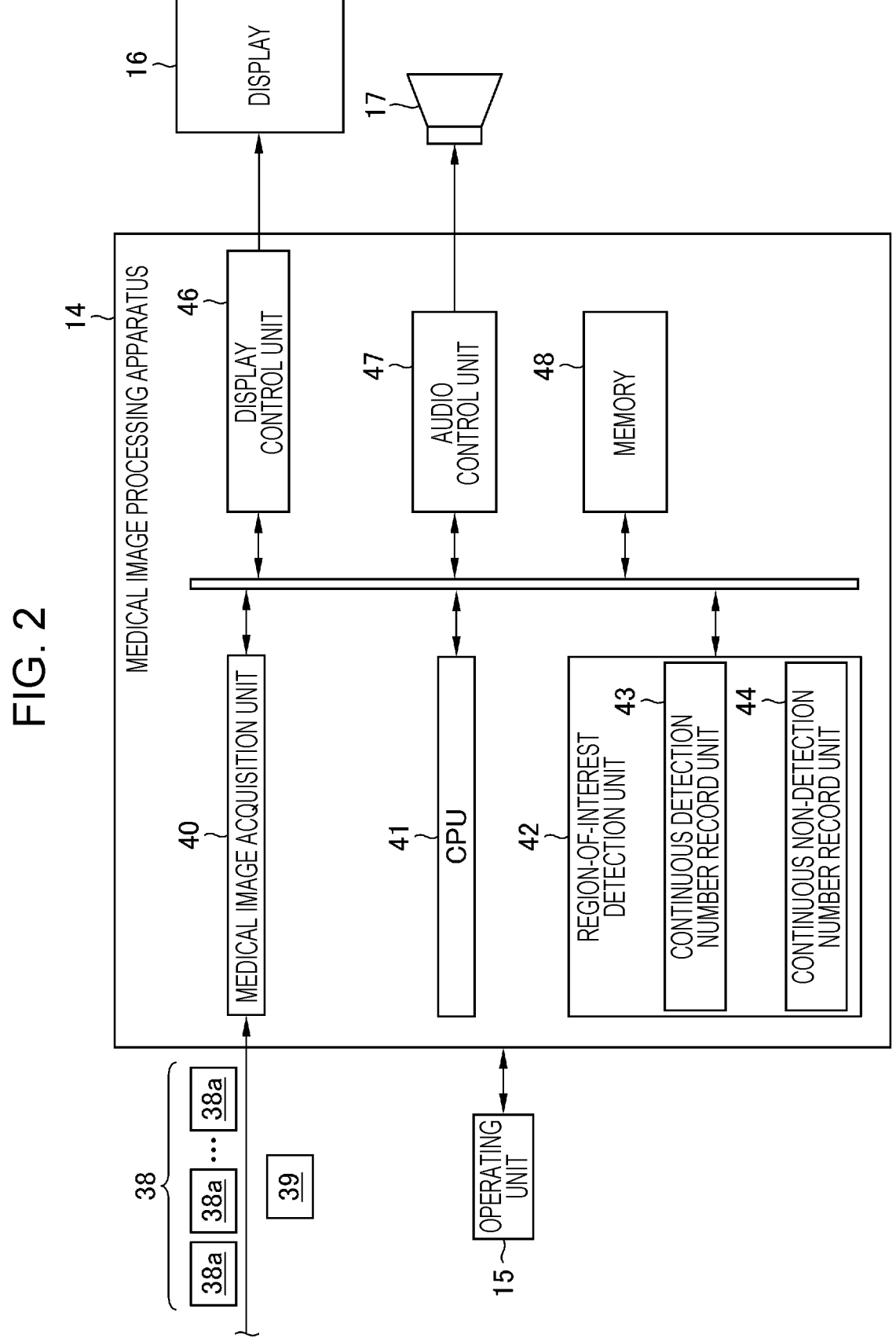
FIG. 2 is a block diagram illustrating a configuration of a medical image processing apparatus.

FIG. 2 is a block diagram illustrating a configuration of the medical image processing apparatus 14. The medical image processing apparatus 14 sequentially acquires time-series medical images, detects a region of interest, and outputs a notification sound. The medical image processing apparatus 14 is constituted by, for example, a computer. The operating unit includes, in addition to a keyboard, a mouse, or the like connected to the computer via wired or wireless connection, buttons provided in the handheld operating unit 21 of the endoscope 10, and various monitors, such as a liquid crystal monitor that can be connected to the computer, are used as the display (display unit) 16.

The medical image processing apparatus 14 is constituted by a medical image acquisition unit 40, a central processing unit (CPU) 41, a region-of-interest detection unit 42, a display control unit 46, an audio control unit 47, and a memory 48. Processing in each unit is implemented by one or more processors. Herein, the processor may be constituted by the CPU 41 or may be constituted by one or more CPUs that are not illustrated.

The CPU 41 operates based on an operating system and various programs including a medical image processing program, which are stored in the memory 48, generally controls the medical image acquisition unit 40, the regionof-interest detection unit 42, the display control unit 46, and the audio control unit 47, and functions as some of these units.

The medical image acquisition unit 40 performs image reception processing for receiving time-series continuous medical images (images). The medical image acquisition unit acquires, from the endoscope processor apparatus 12 (FIG. 1), time-series continuous medical images including a subject image by using an image input/output interface, which is not illustrated, connected to the endoscope processor apparatus 12 via wired or wireless connection. In this example, the moving image 38 captured by the endoscope 10 is acquired. In addition, if the above-described still image 39 is captured while the moving image 38 is being captured by the endoscope 10, the medical image acquisition unit 40 acquires the moving image 38 and the still image 39 from the endoscope processor apparatus 12.

The region-of-interest detection unit 42 performs region-of-interest detection processing for detecting a region of interest from a medical image acquired by the medical image acquisition unit 40. Herein, the region of interest is a lesion, each site of an organ that is an examination target, or the like. Specific examples of the region of interest (lesion) include a cancer lesion, an adenoma lesion, and a hyperplastic lesion. The region-of-interest detection unit 42 is constituted by, for example, a Convolutional Neural Network model detector. The region-of-interest detection unit 42 is trained in advance by deep learning. Specifically, learning is performed in such a manner that a medical image is input to the Convolutional Neural Network model to detect a region of interest. Then, the region-of-interest detection unit 42 is constituted by the trained model that has completed learning.

In addition, the region-of-interest detection unit 42 includes a continuous detection number record unit 43 and a continuous non-detection number record unit 44. The continuous detection number record unit 43 records the number of frames in which the region-of-interest detection unit 42 continuously detects the region of interest. In addition, the continuous non-detection number record unit 44 records the number of frames in which the region-of-interest detection unit 42 does not continuously detect the region of interest. For example, based on the record in the continuous detection number record unit 43, if the region of interest is continuously detected in a predetermined number of frames, the region-of-interest detection unit 42 confirms the detection of the region of interest. In addition, for example, the region-of-interest detection unit 42 can calculate a continuous non-detection time (first time), which will be described later, based on the record in the continuous non-detection number record unit 44.

The display control unit 46 causes the display 16 to display the medical image. In addition, the display control unit 46 causes the display 16 to display the detected region of interest in an emphasized manner. The display control unit 46 generates image data to be displayed based on the medical image (the moving image 38) acquired by the medical image acquisition unit 40 and outputs the image data to the display 16. In addition, the display control unit 46 causes the display 16 to display, in an emphasized manner, the detected region of interest surrounded by a rectangle, for example.

The audio control unit 47 performs audio control processing and causes an audio notifier 17 to output a notification sound if the region-of-interest detection unit 42 detects the region of interest. The audio notifier 17 is constituted by a speaker, for example. The notification sound is output for a certain period. For example, the notification sound is constituted by a sound of "Pong" for 1 second and subsequent reverberation for 2 seconds. Note that the duration of the notification sound can be changed by setting. For example, the notification sound (sound of Pong) is set by the user within a range (range of greater than or equal to 1 second and less than or equal to 2 seconds) in which a human does not feel that the notification sound is long. In addition, the reverberation is set by the user within a range (a range of greater than or equal to 2 seconds and less than or equal to 3 seconds) in which a continuous notification sound is not heard by human senses.

In addition, the audio control unit 47 causes the notification sound to be output in accordance with the continuous non-detection time. The audio control unit 47 compares the continuous non-detection time with a first threshold value, and if the continuous non-detection time is the first threshold value, causes the notification sound to be output upon detection of the region of interest. In addition, if the continuous non-detection time is less than the first threshold value, even if the region of interest is detected, the audio control unit 47 stops output of the notification sound. Here, the first threshold value is set in accordance with the number of frame images 38a or the time. For example, if the first threshold value is set by the number of frame images 38a, the first threshold value is set to 30 frames in a 60 fps moving image setting. In addition, for example, if the first threshold value is set by the time, the first threshold value is set to 0.5 seconds. Note that in consideration of, for example, the time required for an examination of a large intestine, the number of observation sites, and the like, the first threshold value is preferably set in a range of greater than or equal to 0.5 seconds and less than or equal to 3.5 seconds, and more preferably set in a range of greater than or equal to 1.5 seconds and less than or equal to 2.5 seconds. Furthermore, even in a case of changing the first threshold value (second embodiment and third embodiment described below), the first threshold value is preferably changed in a range of greater than or equal to 0.5 seconds and less than or equal to 3.5 seconds.

The memory 48 includes a flash memory, a read-only memory (ROM), a random access memory (RAM), a hard disk apparatus, and the like. The flash memory, the ROM, and the hard disk apparatus are non-volatile memories that store an operation system, various programs such as a medical image processing program, the captured still image 39, and the like. In addition, the RAM is a volatile memory from which data can be read and on which data can be written at high speed and that functions as an area for temporarily storing various programs stored in the non-volatile memory and as a work area for the CPU 41.

Next, output of the notification sound by the audio control unit 47 will be described.

Figure 3:
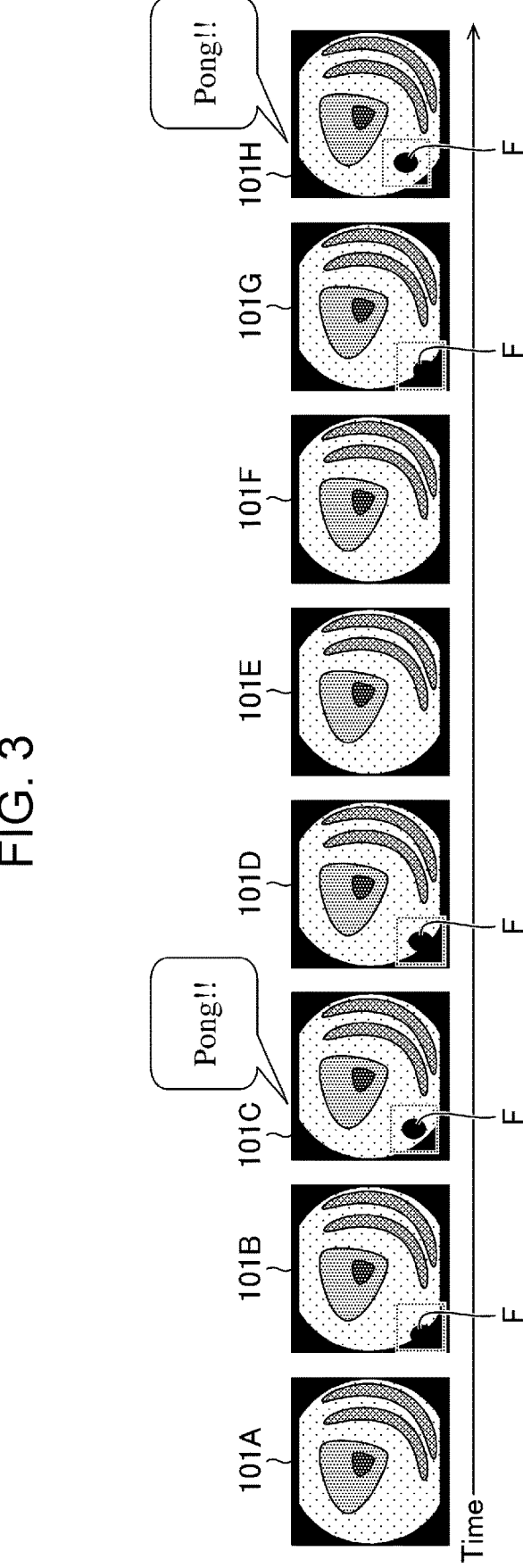
FIG. 3 is a diagram for describing a conventional example in which a notification sound is repeatedly output in a short time.

FIG. 3 is a diagram for describing a conventional example in which the notification sound is repeatedly output in a short time. Note that illustrated medical images 101A to 101H are frame images 38a constituting the moving image 38, but do not correspond to actual frame rates.

In the example illustrated in FIG. 3, the time-series continuous medical images 101A to 101H are received by the medical image acquisition unit 40. Then, the region-of-interest detection unit 42 detects a lesion F in the medical images 101B to 101D and also detects the lesion F in the medical images 101G and 101H. Then, when the region-of-interest detection unit 42 detects the lesion F in the medical image 101C, the audio control unit 47 causes the audio notifier 17 to output the notification sound "Pong". In this case, the region-of-interest detection unit 42 is set to confirm the detection when the record in the continuous detection number record unit 43 becomes "2". Thus, the audio control unit 47 causes the audio notifier 17 to output the notification sound at the timing of detection of the lesion F in the medical image 101C. In addition, when the lesion F is detected in the medical image 101H, the audio control unit 47 also causes the notification sound to be output in the same manner. The interval between the notification sound in the medical image 101C and the notification sound in the medical image 101H is a short interval (four frames (the medical images 101D to 101G)) in the illustrated case. If the notification sound is repeatedly output at short intervals in this manner, the user may feel uncomfortable, and the effectiveness of the notification sound for calling attention may be impaired. Thus, in this embodiment, as described below, the audio control unit 47 outputs the notification sound in accordance with the continuous non-detection time.

Figure 4:
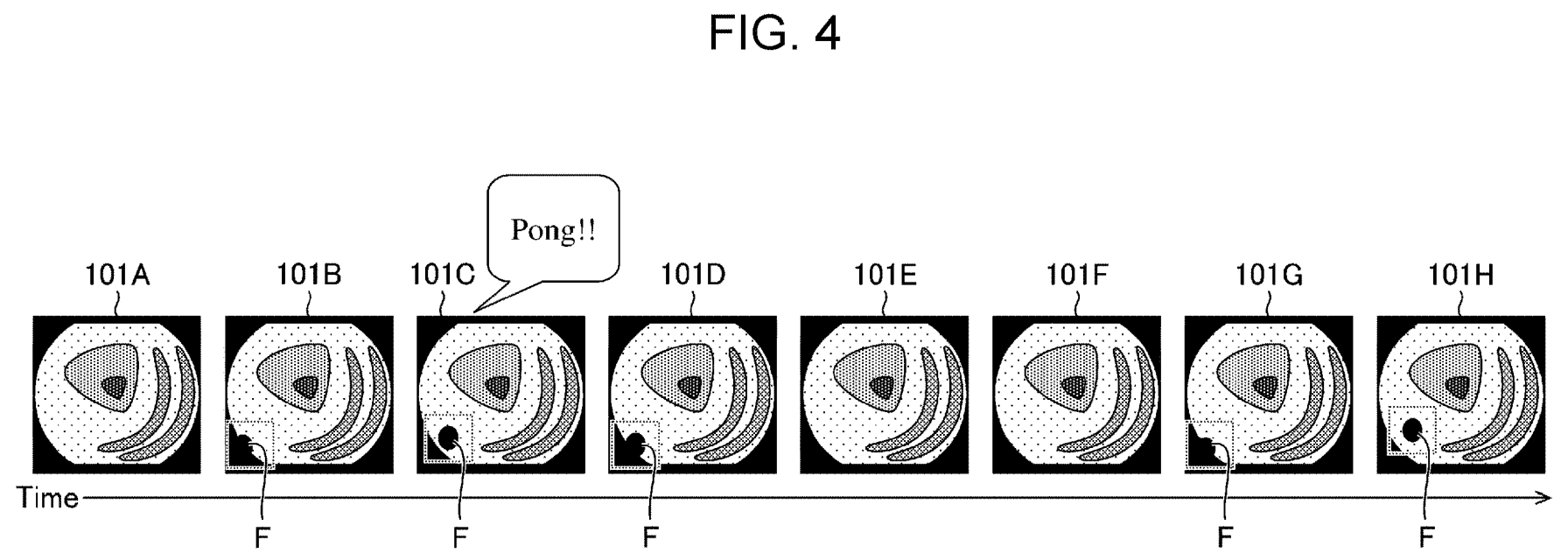

FIG. 4 is a diagram for describing a case where the notification sound is output in accordance with the continuous non-detection time. In the case illustrated in FIG. 4, the time-series continuous medical images 101A to 101H are received by the medical image acquisition unit 40 as in FIG. 3. Then, the region-of-interest detection unit 42 detects a region of interest in the medical images 101B to 101D and the medical images 101G and 101H. In the case of this example, the continuous non-detection time is set to, for example, 2 seconds, and if a continuous non-detection time of 2 seconds has not elapsed, the audio control unit 47 stops output of the notification sound even if the lesion F is detected. In the illustrated case, the region of interest is detected in the medical image 101D, and then, before the continuous non-detection time elapses, the lesion F is detected in the medical image 101G and the medical image 101H. Thus, even if the lesion F is detected in the medical image 101G and the medical image 101H, the audio control unit 47 stops output of the notification sound. In this manner, by controlling output of the notification sound in accordance with the continuous non-detection time, the notification sound is suppressed from being repeatedly output in a short time, and the effectiveness of the notification sound in calling attention can be prevented from being impaired.

Next, setting of the continuous non-detection time will be described. The audio control unit 47 causes the audio notifier 17 to output the notification sound in accordance with the continuous non-detection time. Herein, the continuous non-detection time is a time from a time point at which detection of the region of interest has previously ended until a time point at which the region of interest is currently detected.

Figure 5:
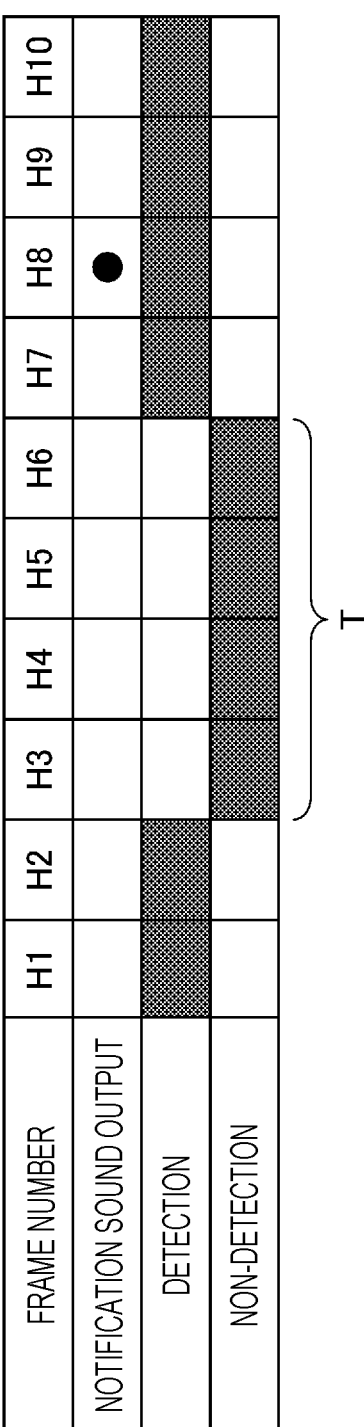
FIG. 5 is a diagram for describing the continuous non-detection time.

FIG. 5 is a diagram for describing the continuous non-detection time. Note that illustrated frames H1 to H10 are frame images 38a constituting the moving image 38, but do not correspond to actual frame rates. In FIG. 5, the time-series continuous frames H1 to H10 are illustrated, and timings at which the notification sound is output (frames in which the notification sound is output are denoted by circles) and whether the region of interest is detected in the respective frames are illustrated (if the region of interest is detected, "detection" is painted in black, and if the region of interest is not detected, "non-detection" is painted in black). In the frames H1 and H2, the region-of-interest detection unit 42 detects the region of interest. Subsequently, the region of interest is not detected in the frames H3 to H6, but the region of interest is detected in the frames H7 to H10. Then, in the frame H8, the notification sound is output. Here, a continuous non-detection time T is a period from the frame H3 to the frame H6. In addition, since the continuous non-detection time T is greater than or equal to the set first threshold value, the audio control unit 47 causes the notification sound to be output in the frame H8. Note that in this case, since the region-of-interest detection unit 42 is set to confirm the detection if the record in the continuous detection number record unit 43 is "2", the notification sound is output at the timing of the detection of the region of interest in the frame H8.

Figure 6:
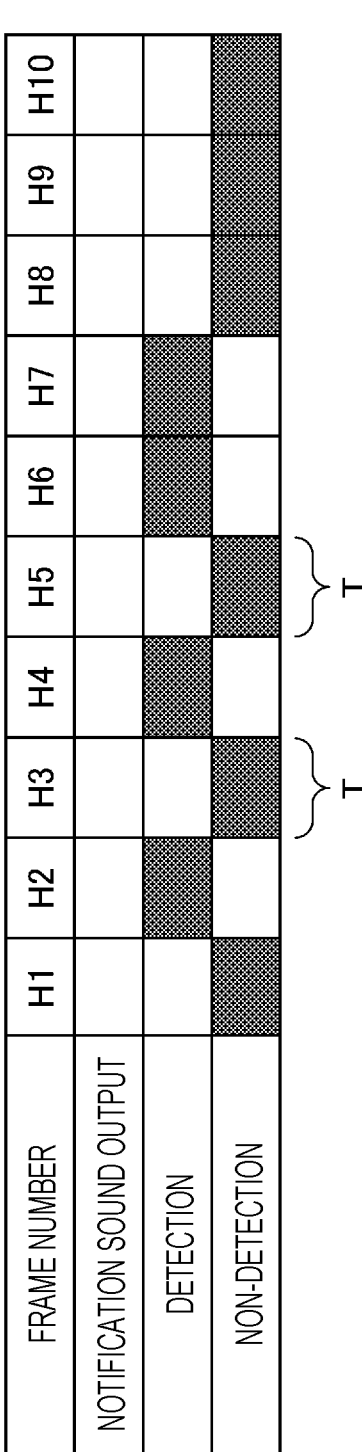
FIG. 6 is a diagram for describing a case where a region of interest is intermittently detected.

FIG. 6 is a diagram for describing a case where the region of interest is intermittently detected.

In FIG. 6, the time-series continuous frames H1 to H10 are illustrated as in FIG. 5. In the case illustrated in FIG. 6, the region of interest is detected in the frame H2, the frame H4, the frame H6, and the frame H7. The continuous non-detection time T is the period of the frame H3 and the frame H5. In addition, since the continuous non-detection time T is less than the set first threshold value, the audio control unit 47 stops output of the notification sound even if the region of interest is detected. In this manner, by controlling output of the notification sound in accordance with the continuous non-detection time, the notification sound is not output if the region of interest is intermittently detected, and the notification sound is suppressed from being repeatedly output in a short time.

Next, an image processing method using the medical image processing apparatus 14 will be described.

Figure 7:
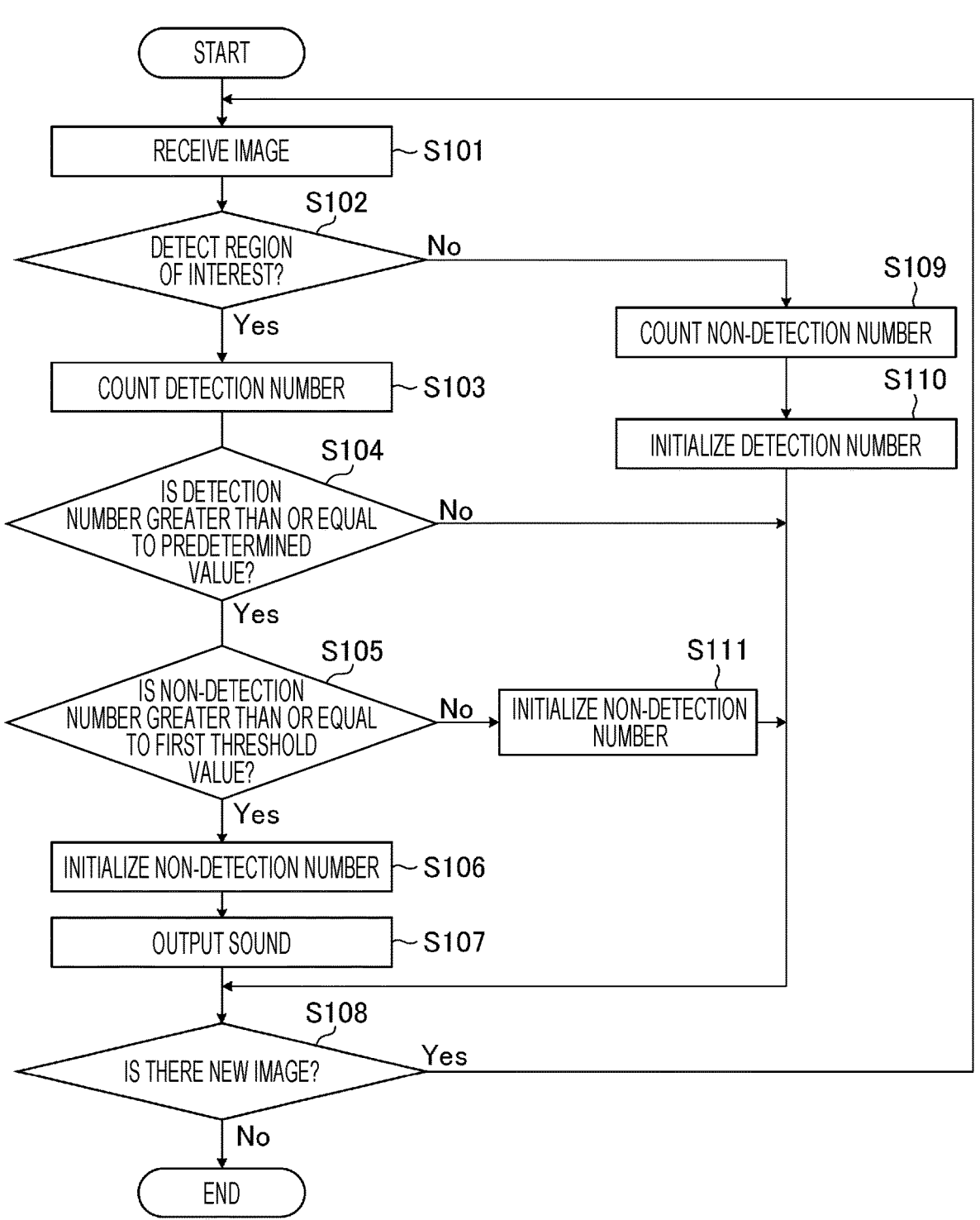
FIG. 7 is a flowchart of an image processing method.

FIG. 7 is a flowchart of the image processing method. Note that each step of the image processing method is performed by the processor of the medical image processing apparatus 14 executing a program.

First, the medical image acquisition unit 40 receives a medical image (image reception step: step S101). Subsequently, the region-of-interest detection unit 42 detects a region of interest in the received medical image (region-of-interest detection step: step S102). If the region-of-interest detection unit 42 does not detect the region of interest in the received medical image, the continuous non-detection number record unit 44 counts a non-detection number (step S109). Subsequently, the continuous detection number record unit 43 initializes a counted continuous detection number (returns to zero) (step S110).

On the other hand, if the region-of-interest detection unit 42 detects the region of interest in the received medical image, the continuous detection number record unit 43 counts a detection number (step S103). Subsequently, the continuous detection number record unit 43 determines whether the counted number of frames in which the region of interest is detected is greater than or equal to a predetermined value (audio control step: step S104). In this case, the region-of-interest detection unit 42 is set to confirm detection of the region of interest if the counted number is greater than or equal to the predetermined value. Subsequently, if the counted detection number is greater than or equal to the predetermined value, the continuous non-detection number record unit 44 determines whether the counted non-detection number is greater than or equal to a first threshold value (step S105). In this case, a continuous non-detection time is measured based on the recorded number in the continuous non-detection number record unit 44. If the non-detection number is less than the first threshold value, the continuous non-detection number record unit 44 initializes the non-detection number (step S111), and the medical image acquisition unit 40 determines whether there is a new medical image (step S108) and, if there is a new medical image, acquires the new medical image (step S101). On the other hand, if the non-detection number is greater than or equal to the first threshold value, the continuous non-detection number record unit 44 initializes the counted non-detection number (step S106). Subsequently, the audio control unit 47 causes a notification sound to be output (audio control step: step S107). Subsequently, the medical image acquisition unit 40 determines whether there is a new image (step S108) and, if there is a new image, acquires the image (step S101).

As described above, according to this embodiment, the notification sound is output in accordance with the continuous non-detection time from the time point at which detection of the region of interest has previously ended until the time point at which the region of interest is currently detected. Thus, in this embodiment, output of the notification sound can be controlled based on the elapsed time from the previous detection of the region of interest, and the notification sound can be output without making the user feel uncomfortable and without impairing the effectiveness of the notification sound in calling attention.

Second Embodiment

Next, a second embodiment of the present invention will be described. In this embodiment, a previous continuous non-detection time (second time) is detected, the previous continuous non-detection time corresponding to the continuous non-detection time in a case where the region of interest has been previously detected, and the first threshold value is changed in accordance with the previous continuous non-detection time.

Figure 8:
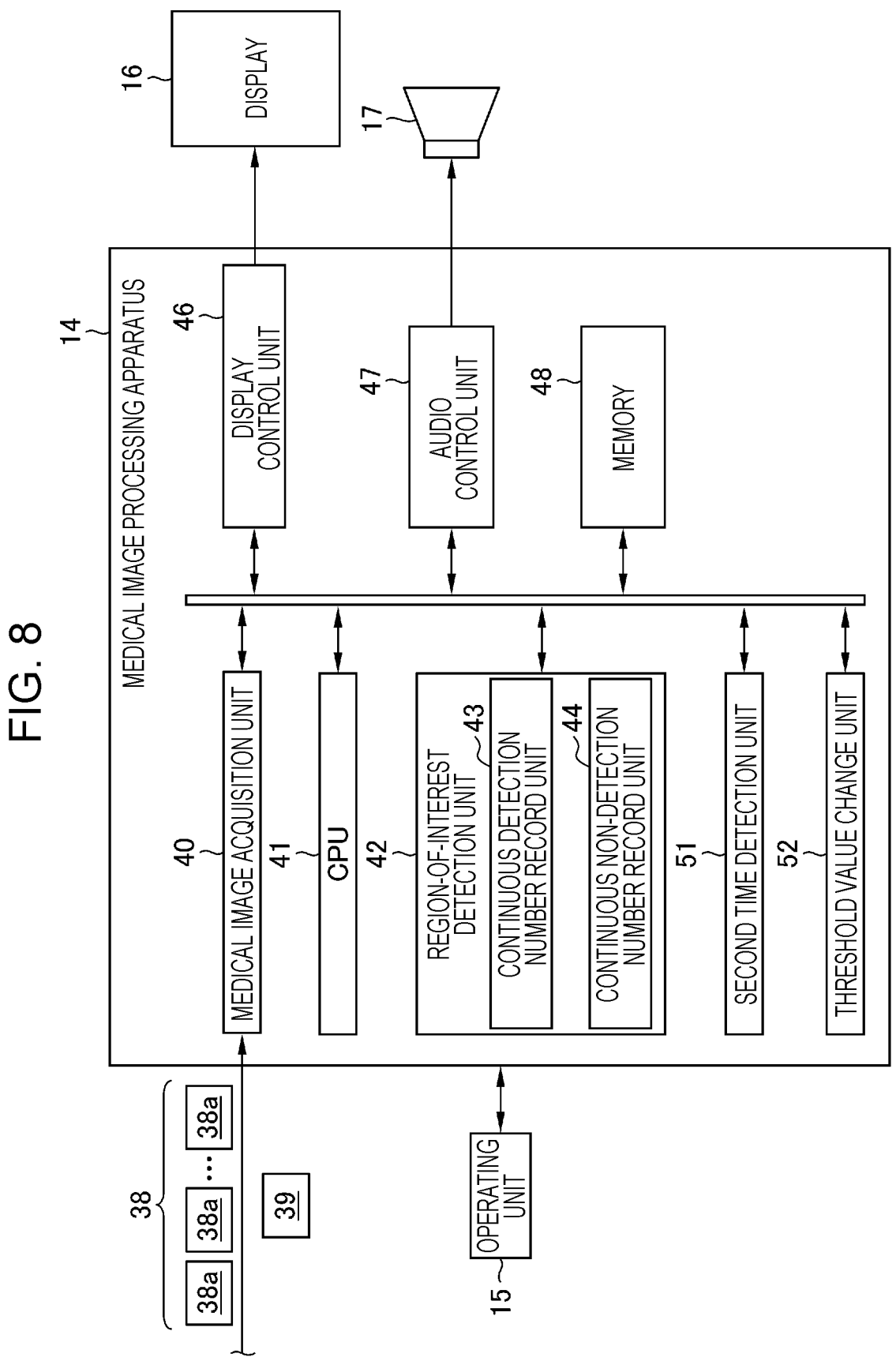
FIG. 8 is a block diagram illustrating a configuration of a medical image processing apparatus.

FIG. 8 is a block diagram illustrating a configuration of the medical image processing apparatus 14 according to this embodiment. Note that portions that have already been described in FIG. 2 are denoted by the same reference numerals, and description thereof is omitted.

A second time detection unit 51 performs second time detection processing for detecting the previous continuous non-detection time corresponding to the continuous non-detection time in a case where the region-of-interest detection unit 42 has previously detected the region of interest.

Figure 9:
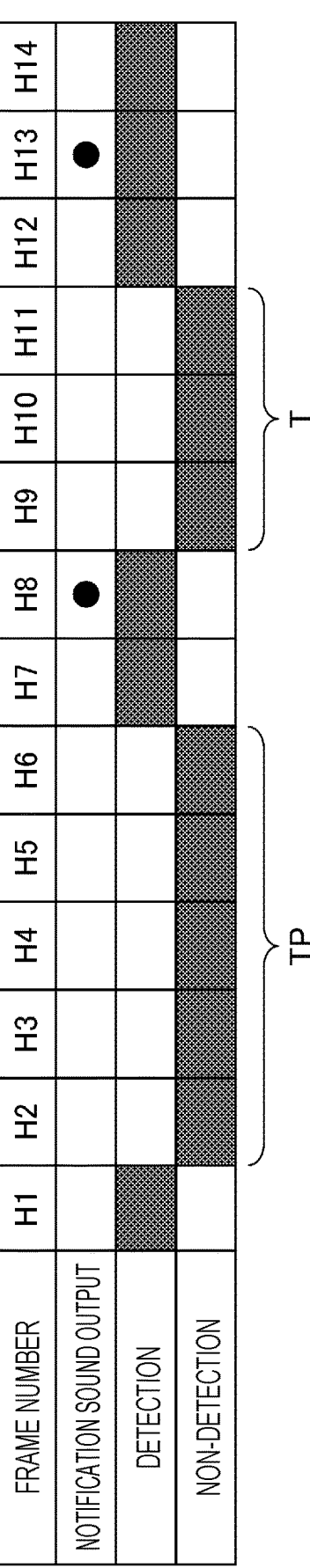
FIG. 9 is a diagram for describing a previous continuous non-detection time.

FIG. 9 is a diagram for describing the previous continuous non-detection time. As in the case illustrated in FIG. 5, FIG. 9 illustrates time-series continuous frames H1 to H14. In the case illustrated in FIG. 9, the region of interest is detected in the frames H1, H7, H8, H12, H13, and H14. In addition, at the timing of detection of the region of interest in the frames H8 and H13, the notification sound is output. Here, considering output of the notification sound at the frame H13, which is the current frame, the continuous non-detection time T is a time corresponding to the frames H9 to H11, and a previous continuous non-detection time TP is a time corresponding to the frames H2 to H6. In this manner, the second time detection unit 51 detects the previous continuous non-detection time TP. The second time detection unit 51 detects the previous continuous non-detection time TP by recording the continuous non-detection time T.

A threshold value change unit 52 (FIG. 8) changes the first threshold value in accordance with the previous continuous non-detection time TP detected by the second time detection unit 51. The threshold value change unit 52 can change the first threshold value in various manners.

For example, if the previous continuous non-detection time TP is greater than or equal to a predetermined value, the threshold value change unit 52 increases the first threshold value. If a longer continuous non-detection time is detected, the audio control unit 47 causes the notification sound to be output. In addition, for example, if the previous continuous non-detection time TP is less than the predetermined value, the threshold value change unit 52 decreases the first threshold value. Then, if a shorter continuous non-detection time is detected, the audio control unit 47 causes the notification sound to be output.

In addition, for example, if the previous continuous non-detection time TP is less than the predetermined value, the threshold value change unit 52 may increase the first threshold value, and if the previous continuous non-detection time TP is greater than or equal to the predetermined value, the threshold value change unit 52 may decrease the first threshold value.

As described above, according to this embodiment, the first threshold value is changed in accordance with the previous continuous non-detection time TP, and output of the notification sound is controlled based on the changed first threshold value. Thus, in this embodiment, the notification sound can be output at an appropriate timing, and the notification sound can be output without making the user feel uncomfortable and without impairing the effectiveness of the notification sound in calling attention.

Third Embodiment

Next, a third embodiment of the present invention will be described. In this embodiment, the number of regions of interest detected by the region-of-interest detection unit 42 is counted, and the first threshold value is changed in accordance with the number of regions of interest.

Figure 10:
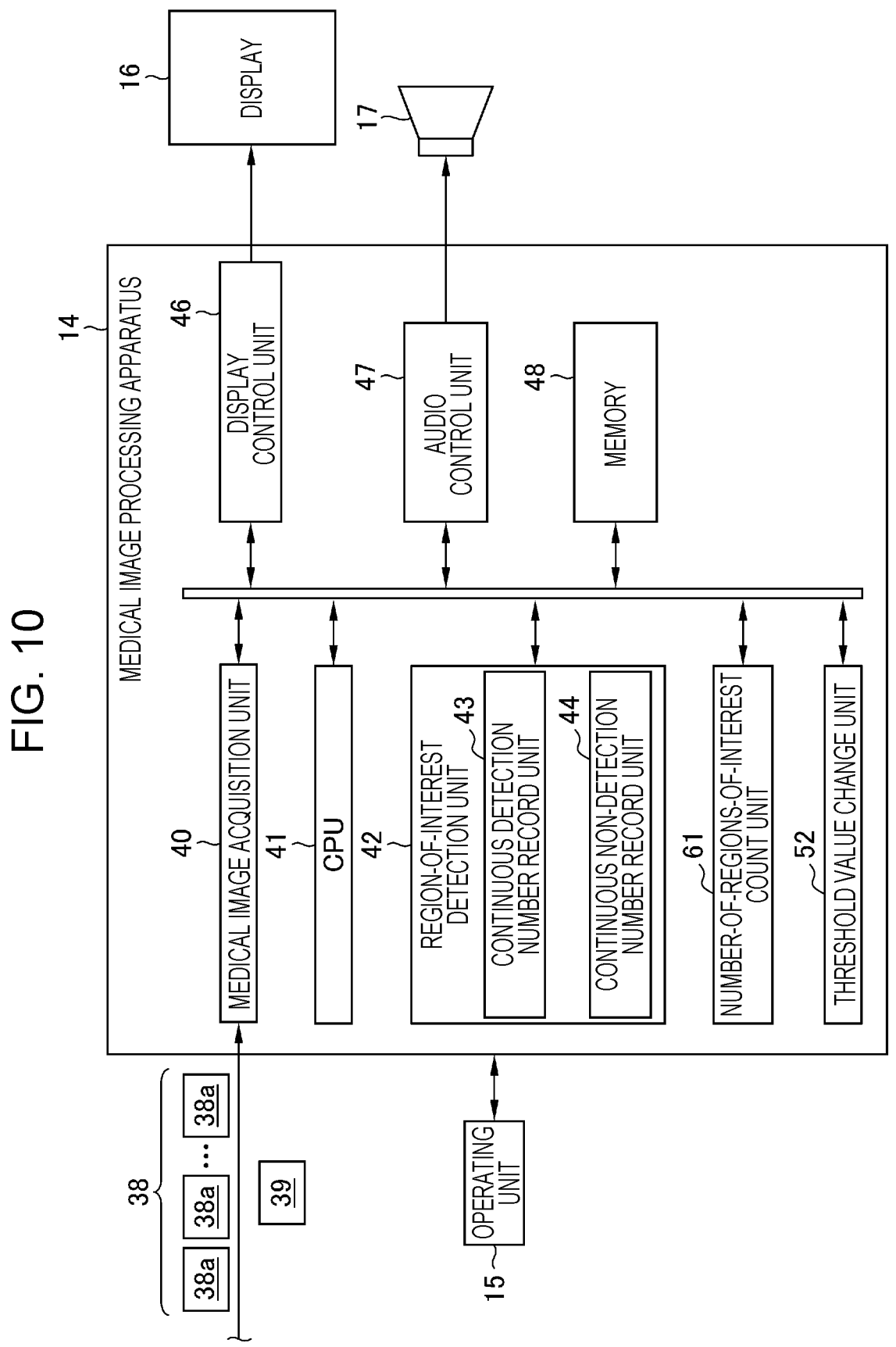
FIG. 10 is a block diagram illustrating a configuration of the medical image processing apparatus.

FIG. 10 is a block diagram illustrating a configuration of the medical image processing apparatus 14 according to this embodiment. Note that portions that have already been described in FIG. 2 are denoted by the same reference numerals, and description thereof is omitted.

A number-of-regions-of-interest count unit 61 performs number-of-regions-of-interest count processing and records, for each medical image (frame), the number of regions of interest detected by the region-of-interest detection unit 42 within the medical image.

The threshold value change unit 52 performs threshold value change processing for changing the first threshold value in accordance with the number counted by the number-of-regions-of-interest count unit 61. For example, if the number of regions of interest is greater than or equal to a second threshold value, the threshold value change unit 52 increases the first threshold value. For example, if a large number of lesions are detected, the audio control unit 47 performs control such that the notification sound is output in response to a long continuous non-detection time. Thus, it is possible to prevent the notification sound from being frequently output as a result of detection of a large number of lesions. In addition, for example, if the number of regions of interest is less than the second threshold value, the threshold value change unit 52 decreases the first threshold value. Thus, if a small number of lesions are detected, the notification sound is output so as not to miss the lesions.

Figure 11:
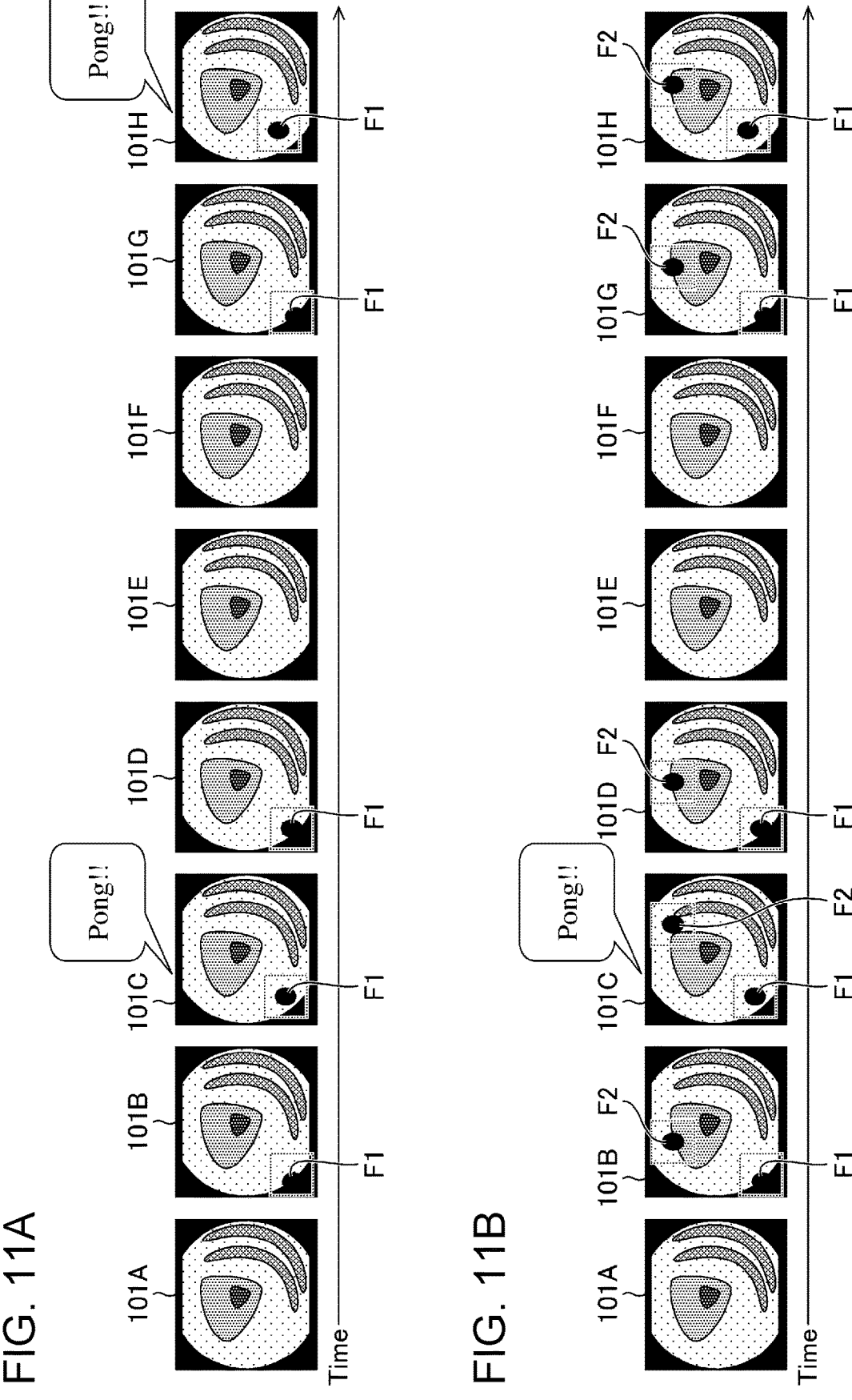
FIGS. 11A and 11B are diagrams for describing timings at which the notification sound is output.

FIGS. 11A and 11B are diagrams for describing timings at which the notification sound is output according to this embodiment.

FIG. 11A is a diagram for describing a case where the number of detected lesions is less than the second threshold value. FIG. 11B is a diagram for describing a case where the number of detected lesions is greater than or equal to the second threshold value.

In FIG. 11A, the region-of-interest detection unit 42 detects a lesion F1 in medical images 101B to 101D, 101G, and 101H. In addition, the number-of-regions-of-interest count unit 61 counts the number of regions of interest detected in each medical image as "1". Since the number of detected regions of interest is less than the second threshold value (in this case, the second threshold value is 2), the threshold value change unit 52 decreases the first threshold value. Thus, after an elapse of a short continuous non-detection time (two frames in the illustrated case), the audio control unit 47 causes the notification sound to be output at the timing of detection of the lesion F1 in the medical image 101H.

In FIG. 11B, the region-of-interest detection unit 42 detects lesions F1 and F2 in the medical images 101B to 101D, 101G, and 101H. In addition, the number-of-regions-of-interest count unit 61 counts the number of regions of interest detected in each medical image as "2". Since the number of detected regions of interest is greater than or equal to the second threshold value (in this case, the second threshold value is 2), the threshold value change unit 52 increases the first threshold value. Thus, in response to an elapse of a short continuous non-detection time (two frames in the illustrated case), the audio control unit 47 stops output of the notification sound at the timing of detection of the lesions F1 and F2 in the medical image 101H. Note that in the illustrated case, the region-of-interest detection unit 42 is set to confirm the detection if the recorded number in the continuous detection number record unit 43 is 2.

According to this embodiment, the number of detected regions of interest is counted, and if the number is greater than or equal to the second threshold value, the first threshold value is increased, whereas if the number is less than the second threshold value, the first threshold value is decreased. Thus, since the notification sound can be output at an appropriate timing in this embodiment, the notification sound can be output without making the user feel uncomfortable and without impairing the effectiveness of the notification sound in calling attention.

Fourth Embodiment

Next, a fourth embodiment will be described. In this embodiment, output of the notification sound is controlled in accordance with the area of the detected region of interest and the continuous non-detection time.

FIG. 12 is a block diagram illustrating a configuration of the medical image processing apparatus 14 according to this embodiment. Note that portions that have already been described in FIG. 2 are denoted by the same reference numerals, and description thereof is omitted.

An area calculation unit 71 performs area calculation processing and calculates the area of the region of interest detected by the region-of-interest detection unit 42. The area calculation unit 71 can calculate the area of the detected region of interest by image processing.

The audio control unit 47 controls output of the notification sound in accordance with the size of the region of interest and the continuous non-detection time. For example, if the area of the region of interest is less than a third threshold value, the audio control unit 47 causes the notification sound to be output. In addition, if the area of the region of interest is greater than the third threshold value and the continuous non-detection time is less than the first threshold value, the audio control unit 47 stops output of the notification sound. In addition, if the area of the region of interest is greater than the third threshold value and the continuous non-detection time is greater than or equal to the first threshold value, the audio control unit 47 causes the notification sound to be output.

Figures 13A, 13B:
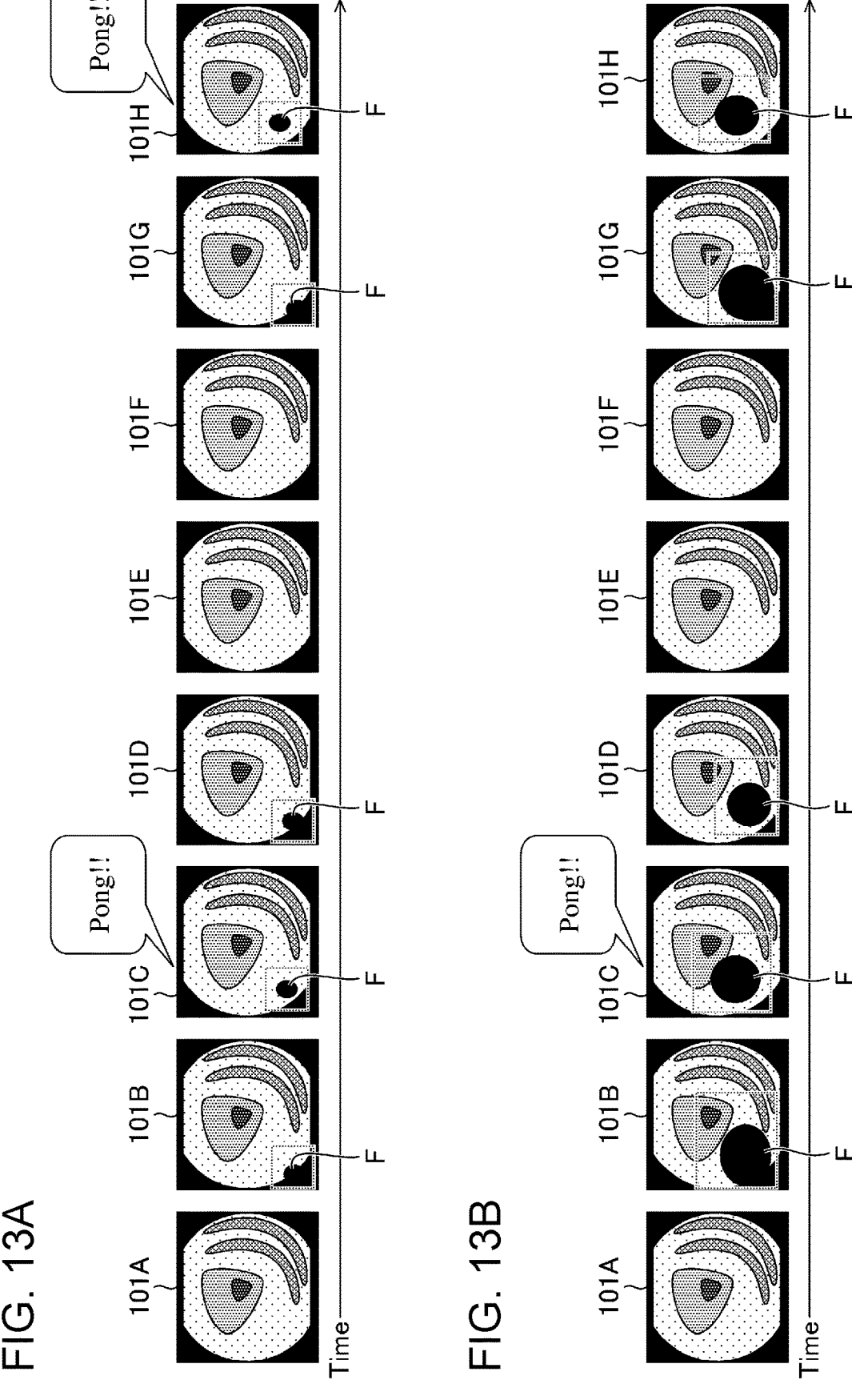
FIGS. 13A and 13B are diagrams for describing timings at which the notification sound is output.

FIGS. 13A and 13B are diagrams for describing timings at which the notification sound is output according to this embodiment. FIG. 13A illustrates a case where the area of a detected lesion F is less than the third threshold value. FIG. 13B illustrates a case where the area of the detected lesion F is greater than or equal to the third threshold value.

In FIG. 13A, the region-of-interest detection unit 42 detects the lesion F in medical images 101B to 101D, 101G, and 101H. In addition, the area calculation unit 71 calculates the area of the lesion F detected in each of the medical images 101B to 101D, 101G, and 101H. In the case illustrated in FIG. 13A, since the area of the lesion F detected in each of the medical images 101B to 101D, 101G, and 101H is less than the third threshold value, the notification sound is output at the timing of detection of the lesion F in each of the medical images 101B to 101D, 101G, and 101H regardless of the continuous non-detection time. In this manner, if the region of interest is small, the notification sound is output in response to detection of the region of interest to call attention, and thus, the user can be prevented from missing the region of interest.

In the case illustrated in FIG. 13B, the area of the lesion F is greater than or equal to the third threshold value. Thus, the audio control unit 47 causes the notification sound to be output in accordance with the continuous non-detection time. Here, in the case illustrated in FIG. 13B, since the continuous non-detection time is less than or equal to the first threshold value, although the lesion F is detected in the medical images 101G and 101H, the audio control unit 47 stops output of the notification sound. By stopping output of the notification sound in this manner, if the region of interest is large, the user can sufficiently recognize the region of interest visually, and thus, it is possible to prevent the notification sound from being output more than necessary.

As described above, according to this embodiment, output of the notification sound is controlled in accordance with the area of the detected region of interest, and thus, the notification sound can be output without making the user feel uncomfortable and without impairing the effectiveness of the notification sound in calling attention.

Fifth Embodiment

Next, a fifth embodiment of the present invention will be described. In this embodiment, output of the notification sound is controlled in accordance with the type of the region of interest detected by the region-of-interest detection unit 42.

FIG. 14 is a block diagram illustrating a configuration of the medical image processing apparatus 14 according to this embodiment. Note that portions that have already been described in FIG. 2 are denoted by the same reference numerals, and description thereof is omitted.

A classification unit 81 performs classification processing for classifying the region of interest detected by the region-of-interest detection unit 42. For example, if the region of interest is a lesion, the classification unit 81 performs classification according to the type or degree of the lesion. In addition, if the region of interest is a site to be examined, the classification unit 81 performs classification according to the type of the site. The classification unit 81 can classify the detected region of interest by various methods. For example, the classification unit 81 can classify the detected region of interest by using a classifier constituted by a trained model of a CNN.

The audio control unit 47 controls output of the notification sound in accordance with the type of the region of interest. For example, if the classification result of classification by the classification unit 81 is a specific type, the audio control unit 47 causes the notification sound to be output. Here, the specific type refers to a severe lesion, a seriously injured lesion, a lesion that is not be particularly missed, a site that serves as a landmark, and the like. In addition, if the classification result of classification by the classification unit 81 is not the specific type and the continuous non-detection time is less than the first threshold value, the audio control unit 47 stops output of the notification sound. In addition, if the classification result of classification by the classification unit 81 is not the specific type and the continuous non-detection time is greater than or equal to the first threshold value, the audio control unit 47 causes the audio notifier 17 to output the notification sound.

FIGS. 15A and 15B are diagrams for describing timings at which the notification sound is output according to this embodiment. FIG. 15A illustrates a case where the classification result of a detected lesion F is the specific type. FIG. 15B illustrates a case where the classification result of the detected lesion F is not the specific type.

In FIG. 15A, the region-of-interest detection unit 42 detects the lesion F in medical images 101B to 101D, 101G, and 101H. In addition, the classification unit 81 classifies the lesion F detected in each of the medical images 101B to 101D, 101G, and 101H. In the case illustrated in FIG. 15A, since the lesion F is of the specific type, regardless of the continuous non-detection time, the notification sound is output at the timing of detection of the lesion F in each of the medical images 101B to 101D, 101G, and 101H. In this manner, if the lesion F is of the specific type (e.g., a severe lesion), the notification sound is output each time the lesion F is detected, thereby preventing the user from missing the region of interest.

In the case illustrated in FIG. 15B, the lesion F is not of the specific type. Thus, the audio control unit 47 causes the notification sound to be output in accordance with the continuous non-detection time. Here, in the case illustrated in FIG. 15B, since the continuous non-detection time is less than or equal to the first threshold value, although the lesion F is detected in the medical images 101G and 101H, the audio control unit 47 stops output of the notification sound.

As described above, according to this embodiment, output of the notification sound is controlled in accordance with the classification of the detected region of interest, and thus, the notification sound can be output without making the user feel uncomfortable and without impairing the effectiveness of the notification sound in calling attention.

Miscellaneous

In the above embodiments, a hardware configuration of processing units (the medical image acquisition unit 40, the region-of-interest detection unit 42, the second time detection unit 51, the threshold value change unit 52, the number-of-regions-of-interest count unit 61, the area calculation unit 71, and the classification unit 81) that perform the processing of the medical image processing apparatus 14 is any of the following various processors. Various processors include a central processing unit (CPU), which is a general-purpose processor that executes software (program) and functions as various processing units, a programmable logic device (PLD), which is a processor in which the circuit configuration is changeable after manufacture, such as field programmable gate array (FPGA), a dedicated electric circuit, which is a processor having a circuit configuration that is specially designed to execute specific processing, such as an application specific integrated circuit (ASIC), and the like.

One processing unit may be constituted by one of these various processors, or may be constituted by two or more processors of the same type or different types (e.g., a combination of a plurality of FPGAs or a combination of a CPU and an FPGA). In addition, a plurality of processing units may be constituted by one processor. As examples for constituting a plurality of processing units by one processor, firstly, there is a form in which one or more CPUs and software are combined to constitute one processor, and this processor functions as a plurality of processing units, as typified by a computer such as a client or a server. Secondly, there is a form of using a processor that implements the functions of the entire system including a plurality of processing units by using one integrated circuit (IC) chip, as typified by a system on chip (SoC) or the like. In this manner, various processing units are constituted by one or more of the above various processors in terms of hardware configuration.

More specifically, the hardware configuration of these various processors is electric circuitry constituted by combining circuit elements such as semiconductor elements.

The above-described configurations and functions can be implemented as appropriate by given hardware, given software, or a combination of both. For example, the present invention can also be applied to a program for causing a computer to execute the above-described processing steps (processing procedure), a computer-readable recording medium (non-transitory recording medium) on which such a program is recorded, or a computer in which such a program can be installed.

Although examples of the present invention have been described above, the present invention is not limited to the above-described embodiments, and it is needless to say that various modifications can be made without departing from the spirit of the present invention.

REFERENCE SIGNS LIST

9 endoscope system
10 endoscope
11 light source apparatus
12 endoscope processor apparatus
13 display apparatus
14 medical image processing apparatus
15 operating unit
16 display
17 audio notifier
20 insertion part
21 handheld operating unit
22 universal cord
25 soft part
26 bending part
27 tip part
28 imaging element
29 bending operation knob
30 air/water supply button
31 suction button
32 still image capturing instruction unit
33 treatment tool introduction port
35 light guide
36 signal cable
37a connector
37b connector
38 moving image
38a frame image
39 still image
40 medical image acquisition unit

41 CPU
42 region-of-interest detection unit
43 continuous detection number record unit
44 continuous non-detection number record unit
46 display control unit
47 audio control unit
48 memory

What is claimed is:

1. A medical image processing apparatus comprising a processor and an audio notifier configured to output a notification sound, wherein
the processor is configured to perform:
image reception processing for receiving time-series continuous images;
region-of-interest detection processing for detecting a region of interest from the images; and
audio control processing for performing control to cause the audio notifier to output the notification sound for a certain period if the region of interest is currently detected in the region-of-interest detection processing, the audio control processing causing the audio notifier to output the notification sound in accordance with a first time, the first time being a time from a time point at which detection of the region of interest has previously ended in the region-of-interest detection processing until a time point at which the region of interest is currently detected in the region-of-interest detection processing and the first time being a period during which the region of interest is not detected in the images, wherein the audio control processing causes the audio notifier to output the notification sound if the first time is greater than or equal to a first threshold value.

2. The medical image processing apparatus according to claim 1, wherein the audio control processing stops output of the notification sound if the region of interest is intermittently detected in the region-of-interest detection processing and the first time is less than the first threshold value.

3. The medical image processing apparatus according to claim 2, wherein the processor is configured to perform:
second time detection processing for detecting a second time corresponding to the first time in a case where the region of interest has been previously detected in the region-of-interest detection processing; and
threshold value change processing for changing the first threshold value in accordance with the second time.

4. The medical image processing apparatus according to claim 3, wherein
the processor is configured to perform number-of-regions-of-interest count processing for counting a number of regions of interest detected in the images in the region-of-interest detection processing, and
the threshold value change processing increases the first threshold value if the number of regions of interest is greater than or equal to a second threshold value.

5. The medical image processing apparatus according to claim 3, wherein
the processor is configured to perform number-of-regions-of-interest count processing for counting a number of regions of interest detected in the images in the region-of-interest detection processing, and
the threshold value change processing decreases the first threshold value if the number of regions of interest is less than a second threshold value.

6. The medical image processing apparatus according to claim 3, wherein the first threshold value is changed in a range of greater than or equal to 0.5 seconds and less than or equal to 3.5 seconds.

7. The medical image processing apparatus according to claim 2, wherein the first threshold value is set in a range of greater than or equal to 1.5 seconds and less than or equal to 2.5 seconds.

8. The medical image processing apparatus according to claim 2, wherein
the processor is configured to perform area calculation processing for calculating an area of the region of interest detected in the region-of-interest detection processing, and
the audio control processing
causes the audio notifier to output the notification sound if the area calculated in the area calculation processing is less than a third threshold value,
stops output of the notification sound by the audio notifier if the area calculated in the area calculation processing is greater than or equal to the third threshold value and the first time is less than the first threshold value, and
causes the audio notifier to output the notification sound if the area calculated in the area calculation processing is greater than or equal to the third threshold value and the first time is greater than or equal to the first threshold value.

9. The medical image processing apparatus according to claim 2, wherein
the processor is configured to perform classification processing for classifying the region of interest detected in the region-of-interest detection processing, and
the audio control processing
causes the audio notifier to output the notification sound if a classification result of classification in the classification processing is a specific type,
stops output of the notification sound by the audio notifier if the classification result of classification in the classification processing is not the specific type and the first time is less than the first threshold value, and
causes the audio notifier to output the notification sound if the classification result of classification in the classification processing is not the specific type and the first time is greater than or equal to the first threshold value.

10. The medical image processing apparatus according to claim 1, wherein the audio control processing
stops output of the notification sound by the audio notifier if the first time is less than the first threshold value.

11. The medical image processing apparatus according to claim 1, wherein the audio control processing detects the first time, based on a number of the time-series continuous images.

12. The medical image processing apparatus according to claim 1, comprising:
a display unit configured to display the images received in the image reception processing, wherein
the region of interest detected in the region-of-interest detection processing is displayed on the display unit in an emphasized manner.

13. A medical image processing method using a medical image processing apparatus comprising a processor and an audio notifier configured to output a notification sound, wherein
the processor is configured to perform:
an image reception step of receiving time-series continuous images;

a region-of-interest detection step of detecting a region of interest from the images; and an audio control step of performing control to cause the audio notifier to output the notification sound for a certain period if the region of interest is currently detected in the region-of-interest detection step, the audio control step causing the audio notifier to output the notification sound in accordance with a first time, the first time being a time from a time point at which detection of the region of interest has previously ended in the region-of-interest detection step until a time point at which the region of interest is currently detected in the region-of-interest detection step, and the first time being a period during which the region of interest is not detected in the images, wherein the audio control step causes the audio notifier to output the notification sound if the first time is greater than or equal to a first threshold value.

14. A non-transitory, computer-readable tangible recording medium on which a program for causing, when read by a computer, the computer to execute the medical image processing method according to claim 13 is recorded.

\* \* \* \* \*